(12) United States Patent
Ono

(10) Patent No.: US 8,017,661 B2
(45) Date of Patent: Sep. 13, 2011

(54) INORGANIC ANION EXCHANGER COMPOSED OF BISMUTH COMPOUND AND RESIN COMPOSITION FOR ELECTRONIC COMPONENT ENCAPSULATION USING THE SAME

(75) Inventor: Yasuharu Ono, Nagoya (JP)

(73) Assignee: Toagosei Co., Ltd., Tokyo (JP)

( * ) Notice: Subject to any disclaimer, the term of this patent is extended or adjusted under 35 U.S.C. 154(b) by 295 days.

(21) Appl. No.: 12/312,633

(22) PCT Filed: Nov. 16, 2007

(86) PCT No.: PCT/JP2007/072265
§ 371 (c)(1),
(2), (4) Date: May 20, 2009

(87) PCT Pub. No.: WO2008/062723
PCT Pub. Date: May 29, 2008

(65) Prior Publication Data
US 2010/0069516 A1    Mar. 18, 2010

(30) Foreign Application Priority Data
Nov. 20, 2006    (JP) .................... 2006 312421

(51) Int. Cl.
*H01B 1/02* (2006.01)
*C09D 1/00* (2006.01)
*C09J 1/00* (2006.01)

(52) U.S. Cl. ............... 521/25; 252/519.1; 252/519.13; 252/389.54

(58) Field of Classification Search ............ 521/25; 252/519.1, 519.13, 389.54
See application file for complete search history.

(56) References Cited

FOREIGN PATENT DOCUMENTS

| JP | S60-040124 A | | 3/1985 |
| JP | S60-042418 A | | 3/1985 |
| JP | 63060112 A | * | 3/1988 |
| JP | S63-060112 A | | 3/1988 |
| JP | S63-252451 A | | 10/1988 |
| JP | S64-064243 A | | 3/1989 |
| JP | H02-293325 A | | 12/1990 |
| JP | H02-294354 A | | 12/1990 |
| JP | H05-140419 A | | 6/1993 |
| JP | 06055081 A | * | 3/1994 |
| JP | H06-055081 A | | 3/1994 |
| JP | H07-267643 A | | 10/1995 |
| JP | H09-314758 A | | 12/1997 |
| JP | H10-007763 A | | 1/1998 |
| JP | H10-013011 A | | 1/1998 |
| JP | H10-287830 A | | 10/1998 |
| JP | H10-330696 A | | 12/1998 |
| JP | 2000-016814 A | | 1/2000 |
| JP | 2000016814 A | * | 1/2000 |
| JP | 2000-226438 A | | 8/2000 |

OTHER PUBLICATIONS

Office Action corresponding with Chinese Application No. 200780042995.6 dated Sep. 1, 2010, 3 pages (in Chinese).

* cited by examiner

*Primary Examiner* — Michael M Bernshteyn
(74) *Attorney, Agent, or Firm* — Fitch, Even, Tabin & Flannery

(57) ABSTRACT

A bismuth compound, useful as an inorganic anion exchanger used for an encapsulating material for, e.g., semiconductors, has a peak intensity of 900 to 2000 cps at 2θ=27.9° to 28.1° and a peak intensity of 100 to 800 cps at 2θ=8.45° to 8.55° in a powder X-ray diffraction pattern, and is represented by the following formula (1):

$$Bi(OH)_x(NO_3)_y \cdot nH_2O \tag{1}$$

wherein x is a positive number not less than 2.5 and less than 3, y is a positive number not more than 0.5, x+y=3, and n is 0 or a positive number.

28 Claims, 7 Drawing Sheets

INORGANIC ANION EXCHANGER COMPOSED OF BISMUTH COMPOUND AND RESIN COMPOSITION FOR ELECTRONIC COMPONENT ENCAPSULATION USING THE SAME

CROSS-REFERENCE TO RELATED APPLICATIONS

This is the U.S. National Phase application of International Application PCT/JP2007/072265, filed Nov. 16, 2007, and claims foreign priority under 35 U.S.C. §119 based on Japanese Application No. 2006-312421, filed Nov. 20, 2006, the entire disclosures of which applications are hereby incorporated herein by reference.

TECHNICAL FIELD

The present invention relates to a novel bismuth compound that is useful as an inorganic anion exchanger and the like used for an encapsulating material for semiconductors or the like in the field of electronic industry, and also relates to an inorganic anion exchanger containing the bismuth compound, and a resin composition for electronic component encapsulation containing the inorganic anion exchanger.

BACKGROUND ART

Conventionally, hydrotalcites, hydrous bismuth oxide, hydrous magnesium oxide, hydrous aluminum oxide, etc. have been known as inorganic anion exchangers.

Among them, bismuth compounds have been known as inorganic anion exchangers for a long time. $Bi_6O_6(OH)_x(NO_3)_{6-x} \cdot nH_2O$ (x is $3.5 \leqq x \leqq 5.5$, and n is 0 or a positive number; for example, see Patent Document 1), and $Bi_{10}O_{13+x}(NO_3)_{4-2x}$ (x is $-0.18 \leqq x \leqq 0.29$; for example, see Patent Document 2) have been proposed as bismuth compounds having high ion exchange performance.

The inorganic anion exchanger is mixed with resins for electronic component encapsulation, resins for electrical component encapsulation, resins for electrical products, etc.

For example, many of LSIs, ICs, hybrid ICs, transistors, diodes, thyristors, and hybrid components thereof are encapsulated using epoxy resins. There has been a demand that such an electronic component encapsulating material does not cause any defect attributed to ionic impurities in a raw material or moisture that invades from the outside. In addition, there has been a demand that the electronic component encapsulating material has various characteristics including flame resistance, high adhesion, crack resistance, and electrical properties such as high volume resistivity.

Epoxy resins often used as electronic component encapsulating materials are mainly composed of an epoxy compound, and also include an epoxy compound curing agent, a cure accelerator, an inorganic filler, a flame retardant, a pigment, a silane coupling agent, etc.

Further, recent higher integration of semiconductors has brought about earlier generation of corrosion of aluminum due to reduction of the aluminum interconnect width on IC chips. This corrosion is promoted mainly by moisture invading an epoxy resin used as an encapsulating material. Since more heat is generated upon use of the semiconductor due to the reduction of the interconnect width, a large amount of a flame retardant such as antimony oxide, a brominated epoxy resin and an inorganic hydroxide is added to the epoxy resin, thereby further promoting corrosion of interconnects made of aluminum or the like.

In order to prevent the above-mentioned corrosion, further improvement in moisture resistance reliability of epoxy resins has been demanded. In order to meet this demand for the improvement in moisture resistance reliability, it has been already proposed that a hydrotalcite that is an inorganic anion exchanger be mixed with the epoxy resin or the like to capture impurity ions that cause problems, especially, halogen ions (for example, see Patent Document 3, Patent Document 4, Patent Document 5, and Patent Document 6, etc.).

Since this compound already has anions such as hydroxide ions and carbonate ions, its anion exchange performance cannot be said sufficient.

When this hydrotalcite compound is calcinated, the anions within its structure are eliminated and a calcined product of a hydrotalcite is obtained. Since this calcined product includes no anion therein, the calcined product has excellent anion exchange performance compared with the hydrotalcite compound. This calcined product restores the layered structure, when absorbing water.

It has been also proposed that this calcined product of the hydrotalcite is mixed with an epoxy resin, etc. (for example, see Patent Document 7). The obtained mixture has excellent anion exchange performance, and effectively improves the moisture resistance reliability of electronic components. On the other hand, since the obtained mixture has very high moisture absorbency and easily absorbs moisture in the air, the obtained mixture absorbs moisture in electronic components, and a volume of the mixture increases with this moisture absorption. Accordingly, when the mixture is exposed to a high temperature in processes in a solder bath, a reflow apparatus, etc., coming off may be generated between insert items, such as a component and a lead frame, and a molding material for encapsulation, due to thermal stress caused by a difference in thermal expansion coefficient of a substrate, etc., or due to vapor pressure generated by vaporization of the absorbed moisture. This coming off may cause cracks in packages, damages of chips, or the like.

An epoxy resin composition for semiconductor encapsulation has been known (for example, see Patent Document 9), in which an oxyacid bismuth oxyhydroxide compound that is an anion exchanger (for example, see Patent Document 8) is blended.

Generally, anion exchangers adsorb anions well when their surrounding environment is acidic, but it is difficult for anion exchangers to adsorb anions when their surrounding environment is around neutral or alkaline. Depending on an additive mixed with the encapsulating material, the pH of the resin composition may become around neutral so that the effect of the anion exchanger may not be sufficiently exhibited.

As a countermeasure against this, a method has been proposed in which a cation exchanger that is a solid acid is mixed with the anion exchanger to reduce an apparent pH so that the mixture can be used with improved ion exchange properties (for example, see Patent Document 10). However, when the solid acid is added to a resin, physical properties of the resin may be impaired. Additionally, cation exchangers often include heavy metals. Recently, use of such cation exchangers in combination may be prohibited due to environmental consideration.

An epoxy resin used for a printed wiring board has been known, in which an inorganic ion exchanger, such as a cation exchanger, anion exchanger and amphoteric ion exchanger, is mixed (for example, see Patent Document 11).

A printed circuit board containing an epoxy resin or a polyphenylene oxide resin together with an ion scavenger in aramid fibers has been known. As this ion scavenger, an ion exchange resin and an inorganic ion exchanger are exemplified, and as the inorganic ion exchanger, an antimony-bismuth-based one and a zirconium-based one are described (for example, see Patent Document 12).

An insulating varnish containing an ion scavenger has been known, and a multi-layered printed wiring board is produced using this insulating varnish. As this ion scavenger, activated carbon, zeolite, silica gel, activated alumina, activated clay, hydrated antimony pentoxide, zirconium phosphate, hydrotalcites, etc. are exemplified (for example, see Patent Document 13).

An adhesive film for multi-layered interconnection boards, with which an inorganic ion adsorbent is mixed, has been known. As this inorganic ion adsorbent, activated carbon, zeolite, silica gel, activated alumina, activated clay, hydrated antimony pentoxide, zirconium phosphate, hydrotalcite, etc. are exemplified (for example, see Patent Document 14).

An epoxy resin adhesive containing an ion trap agent has been known. An anion exchanger or a cation exchanger is exemplified as this ion trap agent (for example, see Patent Document 15).

A conductive epoxy resin paste containing an ion scavenger, silver powders and so on has been known. As this ion scavenger, hydrated bismuth nitrate, magnesium aluminum hydrotalcite, antimony oxide, etc. are exemplified (for example, see Patent Document 16).

The hydrotalcites mentioned as an ion exchanger and an ion scavenger in the above-mentioned known examples are used as they are, or as a calcined body.

Among these, hydrotalcites and hydrous bismuth oxide have high anion exchangeability, and comparatively excellent chemical resistance and thermal resistance, and therefore, are used for various applications. For example, in the field of electronic industry, they are blended with encapsulating resins for semiconductors, and used in order to improve reliability of semiconductor components, etc.

However, hydrotalcites are highly soluble under high temperature and high humidity conditions, such as in hot water at not less than 100° C. Moreover, since hydrotalcites are so high in moisture absorbency as to give an adverse influence on physical properties of encapsulating resins, the range of application of hydrotalcites is limited.

On the other hand, bismuth compounds such as hydrous bismuth oxide have excellent anion exchange performance and have been applicable in a wider range. However, in order to cope with further reduction of aluminum interconnect width in IC chips in recent years and the resulting generation of heat, a material of high performance having higher ion exchangeability, higher thermal resistance and so on has been demanded, and there have been applications for which conventional bismuth compounds cannot be used.

Patent Document 1: Japanese Patent Laid-Open (Kokai) No. 63-60112
Patent Document 2: Japanese Patent Laid-Open (Kokai) No. 07-267643
Patent Document 3: Japanese Patent Laid-Open (Kokai) No. 63-252451
Patent Document 4: Japanese Patent Laid-Open (Kokai) No. 64-64243
Patent Document 5: Japanese Patent Laid-Open (Kokai) No. 60-40124
Patent Document 6: Japanese Patent Laid-Open (Kokai) No. 2000-226438
Patent Document 7: Japanese Patent Laid-Open (Kokai) No. 60-42418
Patent Document 8: Japanese Patent Laid-Open (Kokai) No. 02-293325
Patent Document 9: Japanese Patent Laid-Open (Kokai) No. 02-294354
Patent Document 10: Japanese Patent Laid-Open (Kokai) No. 60-23901
Patent Document 11: Japanese Patent Laid-Open (Kokai) No. 05-140419
Patent Document 12: Japanese Patent Laid-Open (Kokai) No. 09-314758
Patent Document 13: Japanese Patent Laid-Open (Kokai) No. 10-287830
Patent Document 14: Japanese Patent Laid-Open (Kokai) No. 10-330696
Patent Document 15: Japanese Patent Laid-Open (Kokai) No. 10-013011
Patent Document 16: Japanese Patent Laid-Open (Kokai) No. 10-007763

DISCLOSURE OF THE INVENTION

Problems to be Solved by the Invention

An object of the present invention is to find out a novel bismuth compound. Further, an object of the present invention is to find out a novel inorganic anion exchanger having environmental friendliness as well as high performance, in consideration of the above-mentioned problems and the like of the currently-known inorganic anion exchangers.

Means for Solving the Problems

As a result of diligent research conducted by the present inventor in order to discover a novel inorganic anion exchanger of high performance that can be used for a semiconductor encapsulating material or the like in the field of electronic industry, the present invention has been completed by finding out a novel bismuth compound represented by the following formula (1):

$$Bi(OH)_x(NO_3)_y \cdot nH_2O \qquad (1)$$

wherein x is a positive number not less than 2.5 and less than 3, y is a positive number not more than 0.5, x+y satisfies a value of 3 (x+y=3), and n is 0 or a positive number, and wherein a peak intensity at 2θ=27.9° to 28.1° is 900 to 2000 cps and a peak intensity at 2θ=8.45° to 8.55° is 100 to 800 cps in a powder X-ray diffraction pattern. That is, the present invention is:

1. A bismuth compound represented by the above-mentioned formula (1);
2. The bismuth compound described in the item 1 above, wherein a peak intensity at 2θ=7.4° to 7.5° is not more than 1000 cps in a powder X-ray diffraction pattern;
3. An inorganic anion exchanger comprising the bismuth compound described in the item 1 or 2 above;
4. The inorganic anion exchanger described in the item 3 above, which has an anion exchange capacity of not less than 2.0 meq/g;
5. The anion exchanger described in the item 3 or 4 above, which has an anion exchange capacity of not less than 0.8 meq/g in a neutral aqueous solution;
6. The inorganic anion exchanger described in any one of the items 3 to 5 above, which shows a mass decrease of not more than 2 mass % when heated to 300° C.;
7. The inorganic anion exchanger described in any one of the items 3 to 6 above, which provides a supernatant having an electric conductivity of not more than 50 μS/cm when suspended in deionized water;

8. A resin composition for encapsulating electronic components, which comprises the inorganic anion exchanger described in any one of the items 3 to 7 above;
9. The resin composition for encapsulating electronic components, described in the item 8 above, further comprising an inorganic cation exchanger;
10. A resin for encapsulating electronic components, obtained by curing the resin composition for encapsulating electronic components described in the item 8 or 9 above;
11. An electronic component obtained by encapsulating a component with the resin composition for encapsulating electronic components described in the item 8 or 9 above;
12. A varnish, adhesive, or paste, comprising the inorganic anion exchanger described in any one of the items 3 to 7 above;
13. The varnish, adhesive, or paste described in the item 12 above, further comprising an inorganic cation exchanger; and
14. A product comprising the varnish, adhesive, or paste described in the item 12 or 13 above.

ADVANTAGES OF THE INVENTION

The newly-found bismuth compound has anion exchangeability comparable to the existing inorganic anion exchangers. Moreover, an effect of suppressing release of anions from a resin is obtained by mixing this bismuth compound with the resin. Consequently, the bismuth compound can be broadly applied to various applications, such as encapsulation, coating, and insulation of electronic components and electrical components that need high reliability. Additionally, the bismuth compound can be used for a stabilizer for resins such as vinyl chloride, an anticorrosive, or the like.

BEST MODE FOR CARRYING OUT THE INVENTION

Hereinafter, the present invention will be described in detail. Unless otherwise stated, "%" denotes "mass %."
Bismuth Compound
The bismuth compound in the present invention represented by the above-mentioned formula (1) has a peak intensity at $2\theta=27.9°$ to $28.1°$ of 900 to 2000 cps and a peak intensity at $2\theta=8.45°$ to $8.55°$ of 100 to 800 cps in a powder X-ray diffraction pattern.

In the present invention, x in the formula (1) is a number which is not less than 2.5 but is less than 3, preferably, a number of 2.6 to less than 3, and more preferably a number of 2.7 to 2.9. When a value of x is less than 2.5, the number of $NO_3$-radicals increases. For that reason, the electric conductivity of the supernatant in the aqueous suspension may become higher, or thermal resistance may deteriorate.

In the present invention, y in the formula (1) is a positive number not more than 0.5, preferably, a positive number not more than 0.4, and more preferably a positive number not more than 0.35. Preferably, y is not less than 0.1, more preferably larger than 0.1, and still more preferably not less than 0.15. When a value of y is 0, ion exchangeability in a neutral aqueous solution lowers.
Powder X-ray Diffraction Pattern
In the present invention, the bismuth compound represented by the formula (1) has a peak intensity at $2\theta=27.9°$ to $28.1°$ in a powder X-ray diffraction pattern of 900 to 2000 cps, more preferably not more than 1900 cps, and still more preferably not more than 1800 cps. In addition, preferably, the peak intensity is not less than 1000 cps. In the present invention, when the peak intensity exceeds 2000 cps, the ion exchangeability in a neutral aqueous solution deteriorates. Moreover, when the peak intensity is less than 900 cps, the bismuth compound becomes easy to elute into hot water, and may have an adverse influence on electronic materials.

In the present invention, the bismuth compound represented by the formula (1) has a peak intensity at $2\theta=8.45°$ to $8.55°$ in a powder X-ray diffraction pattern of 100 to 800 cps, more preferably 200 to 700 cps, and still more preferably 300 to 600 cps.

In the present invention, the bismuth compound represented by the formula (1) may be that having a peak at $2\theta=7.4°$ to $7.5°$ in a powder X-ray diffraction pattern. The peak intensity is preferably not more than 1000 cps, more preferably not more than 700 cps, and still more preferably not more than 400 cps. This peak is considered to be a peak of a bismuth compound having a large amount of nitric acid. A small amount of nitric acid does not have an adverse influence on the composition of the present invention. However, when the peak intensity exceeds 1000 cps, the ion exchangeability deteriorates and nitrate ions become easy to elute into hot water.

The bismuth compound in the present invention includes one which has the above-mentioned peaks in the powder X-ray diffraction pattern and is represented by the followings:
$Bi(OH)_{2.5}(NO_3)_{0.5}$, $Bi(OH)_{2.55}(NO_3)_{0.45}$,
$Bi(OH)_{2.6}(NO_3)_{0.4}$, $Bi(OH)_{2.65}(NO_3)_{0.35}$,
$Bi(OH)_{2.7}(NO_3)_{0.3}$, $Bi(OH)_{2.75}(NO_3)_{0.25}$,
$Bi(OH)_{2.8}(NO_3)_{0.2}$, $Bi(OH)_{2.85}(NO_3)_{0.15}$,
$Bi(OH)_{2.9}(NO_3)_{0.1}$, $Bi(OH)_{2.95}(NO_3)_{0.05}$, and the like.

As a raw material for obtaining the bismuth compound in the present invention, any raw material can be used as long as it provides a bismuth compound which is represented by the formula (1) and has anion exchangeability. For example, the bismuth compound in the present invention can be obtained by adjusting the pH of an aqueous solution of bismuth nitrate to basic so as to produce precipitates and drying the precipitates.

The bismuth compound in the present invention can be obtained, for example, by adjusting the pH of an aqueous solution of bismuth nitrate to basic to produce precipitates, drying the precipitates, and subsequently heating the precipitates. The pH of the aqueous solution adjusted to basic is preferably 7.1 to 12, more preferably 8 to 11.5, and still more preferably 9 to 11. The temperature of the solution when the precipitates are produced is preferably 1 to 100° C., more preferably 10 to 80° C., and still more preferably 20 to 60° C.

In the present invention, preferable examples of compounds that can be used for this pH adjustment can include alkali metal hydroxides, alkali metal carbonates, alkali metal hydrogencarbonates, ammonia, compounds from which ammonia is generated by heating (for example, urea, hexamethylenetetramine, etc.), etc. Alkali metal hydroxides are more preferable. As this alkali metal, sodium and potassium are preferable.

In the present invention, a preferable method for obtaining a uniform bismuth compound is a method of slowly dropping an alkaline solution into a bismuth solution to adjust the bismuth solution to a target pH, thereby producing precipitates. Alternatively, it is also possible to produce precipitates by simultaneously dropping a bismuth solution and an alkaline solution while the pH is adjusted to the value mentioned above.

In the present invention, drying after the above-mentioned precipitation may be performed at room temperature or by heating. Namely, any kind of process may be performed as long as excessive moisture can be removed from the precipitate. A heat drying furnace or the like can be used for heating.

The drying temperature in the present invention is preferably 50 to 250° C., and more preferably 100 to 200° C.

The thus-obtained bismuth compound in the present invention can be ground to a desired particle size by performing a grinding process, depending on a purpose.

Although the particle size of the bismuth compound in the present invention is not limited in particular, an average particle size is preferably 0.01 to 10 µm, and more preferably 0.05 to 3 µm. When the average particle size is not more than 0.01 µm, the bismuth compound may easily aggregate. When the average particle size is not less than 10 µm, addition of the bismuth compound to a resin may impair physical properties of the resin.

Anion Exchange Capacity

The anion exchange capacity in the present invention is measured using hydrochloric acid. Namely, 1 g of a sample and 50 ml of hydrochloric acid at a concentration of 0.1 mol/L were placed into a 100-ml polyethylene bottle, and shaken at 40° C. for 24 hours. Subsequently, a chlorine ion concentration of the supernatant was measured with ion chromatography. Then, a chlorine ion concentration was measured as a blank value by the same operation as above except no sample was used, and then was used to calculate an anion exchange capacity.

The anion exchange capacity of the inorganic anion exchanger of the present invention is preferably not less than 2.0 meq/g, more preferably not less than 2.5 meq/g, still more preferably not less than 3.0 meq/g, and generally, not more than 10 meq/g. The anion exchanger of the present invention is suitable for applications such as encapsulation of electronic components, when the anion exchange capacity thereof is within the above-mentioned range. Furthermore, the anion exchanger of the present invention is more suitable for applications such as encapsulation of electronic components, when the anion exchange capacity in a neutral aqueous solution is within a range described below.

Anion Exchange Capacity in a Neutral Aqueous Solution

The anion exchange capacity in a neutral aqueous solution in the present invention is measured using a sodium chloride aqueous solution. Namely, 1 g of a sample and 50 ml of a sodium chloride aqueous solution at 0.1 mol/L concentration were placed into a 100-ml polyethylene bottle, and shaken at 40° C. for 24 hours. Subsequently, a chlorine ion concentration of the supernatant was measured with ion chromatography. Then, a chlorine ion concentration was measured as a blank value by the same operation as above except no sample was used, and then was used to calculate an anion exchange capacity.

The anion exchange capacity of the inorganic anion exchanger of the present invention in the neutral aqueous solution is preferably not less than 0.8 meq/g, more preferably not less than 1.0 meq/g, still more preferably not less than 1.2 meq/g, and generally not more than 5 meq/g. This neutral aqueous solution has a pH of 5 to 7.

The anion exchanger of the present invention is suitable for applications such as encapsulation of electronic components, when the anion exchange capacity in the neutral aqueous solution is within the above-mentioned range.

Thermal Resistance

Thermal resistance in the present invention is represented by a mass that decreases when the bismuth compound of the present invention is heated at 300° C. The thermal resistance is preferably not more than 2.0%, more preferably not more than 1.7%, and still more preferably not more than 1.4%.

The anion exchanger of the present invention is suitable for applications such as encapsulation of electronic components, when the thermal resistance is within the above-mentioned range.

Electric Conductivity

The electric conductivity of the supernatant in the present invention is obtained by mixing deionized water with a sample, stirring and suspending the mixture, and subsequently, measuring an electric conductivity of the resultant supernatant. Namely, 0.5 g of a sample and 50 ml of deionized water were placed into a 100-ml polypropylene bottle, stirred, and suspended. Subsequently, the bottle was stoppered and maintained at 95° C. for 20 hours (the bottle had a small hole). Then, the bottle was cooled, the solution was filtered by a 0.1 µm membrane filter, and an electric conductivity of the filtrate was measured.

The electric conductivity of the supernatant provided by the inorganic anion exchanger of the present invention is preferably not more than 50 µS/cm, more preferably not more than 40 µS/cm, and still more preferably not more than 30 µS/cm. Generally, not less than 5 µS/cm is preferable.

The anion exchanger of the present invention is suitable for applications such as encapsulation of electronic components, when the electric conductivity is within the above-mentioned range.

The inorganic anion exchanger of the present invention is still more suitable for applications such as encapsulation of electronic components, for example, when the anion exchange capacity is not less than 2.0 meq/g and the electric conductivity of the supernatant is not more than 50 µS/cm.

Resin Composition for Encapsulating Electronic Components

Resin components used for the resin composition for encapsulating electronic components containing the inorganic anion exchanger of the present invention may be thermosetting resins, such as phenol resins, urea resins, melamine resins, unsaturated polyester resins, and epoxy resins, or may be thermoplastic resins, such as polyethylene, polystyrene, vinyl chloride, and polypropylene. Preferable resin components are thermosetting resins. The thermosetting resins used for the resin composition for encapsulating electronic components of the present invention are preferably phenol resins or epoxy resins, and particularly preferably epoxy resins.

Epoxy Resin Composition for Encapsulating Electronic Components

Epoxy resins used for the present invention are not limited, and any epoxy resin used as resins for electronic component encapsulation can be used. For example, any kind of epoxy resins having not less than two epoxy groups in one molecule so as to be curable can be used. Any of the epoxy resins used as molding materials, such as phenol novolak epoxy resins, bisphenol A type epoxy resins, bisphenol F type epoxy resins, and cycloaliphatic epoxy resins, can be used. In order to improve moisture resistance of the composition of the present invention, an epoxy resin containing not more than 10 ppm of chloride ions and not more than 1000 ppm of hydrolytic chlorine is preferably used.

In the present invention, the epoxy resin composition for encapsulating electronic components preferably contains a curing agent and a curing accelerator.

As the curing agent used for the present invention, any of the known curing agents for epoxy resin compositions can be used. Preferable examples thereof include acid anhydrides, amine based curing agents, novolak based curing agents, and the like.

As the curing accelerator used for the present invention, any of the known curing accelerators for epoxy resin compositions can be used. Preferable examples thereof include amine based accelerators, phosphorus based accelerators, imidazole based accelerators, and the like.

A component known to be mixed with molding resins can also be mixed with the resin composition for encapsulating electronic components of the present invention, when needed. Examples of such a component include an inorganic filler, a flame retardant, a coupling agent for an inorganic filler, a colorant, a release agent, etc. Each of these components is known as a component mixed with a molding epoxy resin. Preferable examples of the inorganic filler include crystalline silica powders, quartz glass powders, fused silica powders, alumina powders, talc, and the like, and among these, crystalline silica powders, quartz glass powders, and fused silica powders are inexpensive and preferable. Examples of the flame retardant include antimony oxide, halogenated epoxy resins, magnesium hydroxide, aluminum hydroxide, red phosphorus based compounds, phosphoric ester based compounds, etc., and examples of the coupling agent include silane based ones, titanium based ones, etc. Moreover, examples of the release agent include waxes such as aliphatic paraffin and higher aliphatic alcohol.

Besides the above-mentioned components, the resin composition for encapsulating electronic components of the present invention can also contain a reactive diluent, a solvent, a thixotropy imparting agent, etc. Specifically, the reactive diluent includes buthylphenyl glycidyl ether, the solvent includes methyl ethyl ketone, and, the thixotropy imparting agent includes organically modified bentonite.

The preferable blending proportion of the inorganic anion exchanger of the present invention is 0.1 to 10 parts by mass, more preferably 1 to 5 parts by mass relative to 100 parts by mass of the resin composition for encapsulating electronic components. When the proportion is less than 0.1 parts by mass, improvement of anion removability and moisture resistance reliability is small. On the other hand, when the proportion exceeds 10 parts by mass, no further improvement is expected but costs will increase.

By using the inorganic anion exchanger of the present invention together with an inorganic cation exchanger, the inorganic anion exchanger of the present invention can be improved in anion capturing capacity, and is also expected to provide an effect of capturing cationic ions. The inorganic cation exchanger is an inorganic substance with cation exchangeability.

The blending proportion of the inorganic anion exchanger of the present invention to the inorganic cation exchanger is not limited in particular, but is preferably 100/0 to 20/80 in terms of inorganic anion exchanger/inorganic cation exchanger as mass ratio. The inorganic anion exchanger of the present invention and the inorganic cation exchanger may be separately mixed with the resin composition for encapsulating electronic components, or may be uniformly blended in advance and then mixed with the resin composition, when the resin composition is produced. The latter method in which they are blended in advanced and then mixed is preferable. This is because the latter method can enhance the effect of the combined use of these components.

Specific examples of the inorganic cation exchanger include antimonic acid (antimony pentoxide hydrate), niobic acid (niobium pentoxide hydrate), manganese oxides, zirconium phosphate, titanium phosphate, tin phosphate, cerium phosphate, zeolite, clay minerals, etc. Antimonic acid (antimony pentoxide hydrate), zirconium phosphate, and titanium phosphate are preferable.

The resin composition for encapsulating electronic components of the present invention can be easily obtained by blending the above-mentioned raw materials by a known method. For example, the above-mentioned respective raw materials are properly mixed. This mixture is kneaded by use of a kneading machine while being heated, so that a semi-curing resin composition is obtained. This semi-curing resin composition is cooled to room temperature, and subsequently, ground by known means. The ground product is molded into tablets when needed. Thereby, the resin composition for encapsulating electronic components can be obtained.

The inorganic anion exchanger of the present invention can be used for various applications, such as encapsulation, coating, insulation, etc. of electronic components and electrical components.

Moreover, the inorganic anion exchanger of the present invention can be used as a stabilizer for resins such as vinyl chloride, an anticorrosive, etc.

The resin composition for encapsulating electronic components with which the inorganic anion exchanger of the present invention is mixed can be used for products in which components including active components such as semiconductor chips, transistors, diodes and thyristors, and passive components such as capacitors, resistors and coils, are mounted on support members such as lead frames, wired tape carriers, wiring boards, glass and silicon wafers. Additionally, the resin composition for encapsulating electronic components of the present invention can be effectively used for printed circuit boards. The epoxy resin composition for encapsulating electronic components with which the inorganic anion exchanger of the present invention is mixed can be used in a similar manner.

As a method of encapsulating the component using the resin composition for encapsulating electronic components or epoxy resin composition for encapsulating electronic components of the present invention, low-pressure transfer molding methods are most generally used, but injection molding methods, compression molding methods, etc. may be used.

About the Application to Wiring Boards

In a general method of manufacturing a wiring board, a substrate for printed circuits is produced using a thermosetting resin such as an epoxy resin. Then, copper foil or the like is attached to the substrate, and is subjected to etching process, etc. to produce a circuit, so that the wiring board is manufactured. However, in recent years, there have occurred problems of corrosion and inferior insulation caused by high integration of circuits, multi-layering of circuits, thinner insulating layers, etc. Such corrosion can be prevented by adding the inorganic anion exchanger of the present invention when manufacturing the wiring board. Corrosion of a wiring board, etc. can be prevented by adding the inorganic anion exchanger of the present invention to an insulating layer for the wiring board. As mentioned above, the wiring board containing the inorganic anion exchanger of the present invention can suppress generation of defectives attributed to corrosion, etc. Preferably, the inorganic anion exchanger of the present invention is added in an amount of 0.1 to 5 parts by mass relative to 100 parts by mass of the resinous solid content in this wiring board or the insulating layer of the wiring board. The inorganic cation exchanger may be contained therein.

About Mixing with an Adhesive

Electronic components, etc. are mounted on a substrate such as for wiring boards by use of an adhesive. By adding the inorganic anion exchanger of the present invention to the adhesive used at that time, generation of defectives attributed to corrosion, etc. can be suppressed. Preferably, the inorganic anion exchanger of the present invention is added in an amount of 0.1 to 5 parts by mass relative to 100 parts by mass of the resinous solid content in this adhesive. An inorganic cation exchanger may be contained therein.

Defects attributed to corrosion, etc. can be suppressed by adding the inorganic anion exchanger of the present invention to a conductive adhesive, etc. used when connecting or wiring an electronic component, etc. to a wiring board. Examples of this conductive adhesive include adhesives of a type containing a conductive metal such as silver. Preferably, the inorganic anion exchanger of the present invention is added in an amount of 0.1 to 5 parts by mass relative to 100 parts by mass of the resinous solid content in the conductive adhesive. An inorganic cation exchanger may be contained therein.

About Mixing with a Varnish

Electric products, printed wiring boards, electronic components, etc. can be manufactured by use of a varnish containing the inorganic anion exchanger of the present invention. Examples of this varnish include varnishes mainly composed of thermosetting resins such as epoxy resins. Preferably, the inorganic anion exchanger of the present invention is added in an amount of 0.1 to 5 parts by mass relative to 100 parts by mass of the resinous solid content in the resin. An inorganic cation exchanger may be contained therein.

About Mixing with a Paste

The inorganic anion exchanger of the present invention can be added to a paste containing silver powders, etc. The paste is used as an adjuvant for soldering, etc., in order to improve adhesion of metals to be connected together. Thereby, generation of corrosive objects from the paste can be suppressed. Preferably, the inorganic anion exchanger of the present invention is added in an amount of 0.1 to 5 parts by mass relative to 100 parts by mass of the resinous solid content in this paste. An inorganic cation exchanger may be contained therein.

EXAMPLES

Hereinafter, the present invention will be described in more detail by way of Examples and Comparative Examples, but the present invention is not limited thereto. The symbol % denotes mass % and a part denotes a part by mass.

Example 1

While a 50% bismuth nitrate aqueous solution was maintained at 25° C. and stirred, a 15% sodium hydroxide aqueous solution and a 2% sodium hydroxide aqueous solution were added to adjust the solution to pH=10. Then, the produced precipitate was filtered and washed with deionized water. This precipitate was dried at 120° C. for 24 hours. Then, the precipitate was ground to obtain a bismuth compound 1 (anion exchanger 1). An analysis of this compound showed that the compound is $Bi(OH)_{2.65}(NO_3)_{0.35}$. Powder X-ray diffraction (XRD) measurement of this compound was performed. The obtained XRD pattern is shown in FIG. 1. As a result, the peak intensity at $2\theta=28°$ was 1100 cps, the peak intensity at $2\theta=8.5°$ was 380 cps, and the peak intensity at $2\theta=7.4°$ was 400 cps.

Composition Analysis of the Bismuth Compound

The above-mentioned bismuth compound was dissolved in nitric acid, and a content of bismuth was measured with an ICP emission spectrometer. Further, 50 ml of a 0.1 N sodium hydroxide solution was added to 0.5 g of the above-mentioned bismuth compound, and treated at 95° C. for 20 hours. The nitrate ion concentration of the treated solution was measured with ion chromatography, and a content of nitric acid was calculated. The composition of the bismuth compound was calculated from these two measurement results.

Measurement of Anion Exchange Capacity 1.0 g of the anion exchanger 1 was placed in a 100-ml polyethylene bottle, and 50 ml of hydrochloric acid with a 0.1 mol/L concentration was further supplied thereto. The bottle was sealed with a stopper, and shaken at 40° C. for 24 hours. Then, this solution was filtered through a membrane filter having a pore size of 0.1 μm, and a chlorine ion concentration of the filtrate was measured with ion chromatography. The anion exchange capacity was calculated in comparison with the chlorine ion concentration measured by performing the same operation except that the anion exchanger 1 was not added. This result is shown in Table 1.

Measurement of the Anion Exchange Capacity in a Neutral Aqueous Solution 1.0 g of the anion exchanger 1 was placed in a 100-ml polyethylene bottle, and 50 ml of a sodium chloride aqueous solution with a 0.1 mol/L concentration was further supplied thereto. The bottle was sealed with a stopper, and shaken at 40° C. for 24 hours. Then, this solution was filtered by a membrane filter having a pore size of 0.1 μm, and a chlorine ion concentration of the filtrate was measured with ion chromatography. The anion exchange capacity was calculated in comparison with the chlorine ion concentration measured by performing the same operation except that the anion exchanger 1 was not added. This result is shown in Table 1.

Measurement of a Percentage of Loss on Heating 10.0 g of the anion exchanger 1 was placed in a porcelain crucible, and the weight thereof was measured. Subsequently, the porcelain crucible was heated at 300° C. for 1 hour, taken out, and then cooled to room temperature within a desiccator. Again, the weight was measured, and a percentage of loss was calculated. These results are shown in Table 1.

Measurement of an Electric Conductivity of a Supernatant 0.5 g of the anion exchanger 1 and 50 ml of deionized water were places in a 100-ml polypropylene bottle, and stirred, and suspended. Then, the bottle was stoppered and maintained at 95° C. for 20 hours (the bottle had a small hole). Then, the bottle was cooled, this solution was filtered through a 0.1 μm membrane filter, and the electric conductivity of the filtrate was measured. The result is shown in Table 1.

Example 2

While a 50% bismuth nitrate aqueous solution was maintained at 25° C. and stirred, a 15% sodium hydroxide aqueous solution and a 2% sodium hydroxide aqueous solution were added to adjust the solution to pH=10.8. Then, the produced precipitate was filtered, and washed with deionized water. This precipitate was dried at 120° C. for 24 hours. Then, the precipitate was ground to obtain a bismuth compound 2 (anion exchanger 2). An analysis of this compound showed that the compound was $Bi(OH)_{2.7}(NO_3)_{0.3}$. Powder X-ray diffraction (XRD) measurement of this compound was performed. The obtained XRD pattern is shown in FIG. 2. As a result, the peak intensity at $2\theta=28°$ was 1200 cps, the peak intensity at $2\theta=8.5°$ was 370 cps, and the peak intensity at $2\theta=7.4°$ was 150 cps.

In the same manner as in Example 1, the anion exchanger 2 was subjected to measurement for the anion exchange capacity, the anion exchange capacity in the neutral aqueous solution, the percentage of loss on heating, and the electric conductivity of the supernatant, and these results were shown in Table 1.

Example 3

While a 50% bismuth nitrate aqueous solution was maintained at 25° C. and stirred, a 15% sodium hydroxide aqueous solution and a 2% sodium hydroxide aqueous solution were added to adjust the solution to pH=12. Then, the produced precipitate was filtered, and washed with deionized water. This precipitate was dried at 120° C. for 24 hours. Then, the precipitate was ground to obtain a bismuth compound 3 (anion exchanger 3). An analysis of this compound showed that the compound was $Bi(OH)_{2.8}(NO_3)_{0.2}$. Powder X-ray diffraction (XRD) measurement of this compound was performed. The obtained XRD pattern is shown in FIG. 3. As a result, the peak intensity at $2\theta=28°$ was 1800 cps, and the peak intensity at $2\theta=8.5°$ was 500 cps.

In the same manner as in Example 1, the anion exchanger 3 was subjected to measurement for the anion exchange capacity, the anion exchange capacity in the neutral aqueous solution, the percentage of loss on heating, and the electric conductivity of the supernatant, and these results were shown in Table 1.

Comparative Example 1

While a 50% bismuth nitrate aqueous solution was maintained at 25° C. and stirred, a 15% sodium hydroxide aqueous solution and a 2% sodium hydroxide aqueous solution were added to adjust the solution to pH=7. Then, the produced precipitate was filtered, and washed with deionized water. This precipitate was dried at 120° C. for 24 hours. Then, the precipitate was ground to obtain a comparative compound 1. An analysis of this compound showed that the compound was $Bi(OH)_{2.4}(NO_3)_{0.6}$. Powder X-ray diffraction (XRD) measurement of this compound was performed. The obtained XRD pattern is shown in FIG. 4. As a result, the peak intensity at $2\theta=28°$ was 730 cps, the peak intensity at $2\theta=8.5°$ was 230 cps, and the peak intensity at $2\theta=7.4°$ was 620 cps.

In the same manner as in Example 1, the comparative compound 1 was subjected to measurement for the anion exchange capacity, the anion exchange capacity in the neutral aqueous solution, the percentage of loss on heating, and the electric conductivity of the supernatant, and these results were shown in Table 1.

Comparative Example 2

While a 50% bismuth nitrate aqueous solution was maintained at 25° C. and stirred, a 15% sodium hydroxide aqueous solution and a 2% sodium hydroxide aqueous solution were added to adjust the solution to pH=13. Then, the produced precipitate was filtered, and washed with deionized water. This precipitate was dried at 120° C. for 24 hours. Then, the precipitate was ground to obtain a comparative compound 2. An analysis of this compound showed that the compound was $Bi(OH)_{2.9}(NO_3)_{0.1}$. Powder X-ray diffraction (XRD) measurement of this compound was performed. The obtained XRD pattern is shown in FIG. 5. As a result, the peak intensity at $2\theta=28°$ was 2400 cps, and the peak intensity at $2\theta=8.5°$ was 650 cps.

In the same manner as in Example 1, the comparative compound 2 was subjected to measurement for the anion exchange capacity, the anion exchange capacity in the neutral aqueous solution, the percentage of loss on heating, and the electric conductivity of the supernatant, and these results were shown in Table 1.

Comparative Example 3

A reagent, bismuth hydroxide $Bi(OH)_3$, was used as a comparative compound 3. The XRD pattern thereof is shown in FIG. 6. The peak intensity at $2\theta=28°$ in the XRD pattern of this bismuth hydroxide was 2800 cps, and the peak intensity at $2\theta=8.5°$ was 900 cps.

In the same manner as in Example 1, the comparative compound 3 was subjected to measurement for the anion exchange capacity, the anion exchange capacity in the neutral aqueous solution, the percentage of loss on heating, and the electric conductivity of the supernatant, and these results were shown in Table 1.

Comparative Example 4

A reagent, bismuth oxide $B_2O_3$, was used as a comparative compound 4. The XRD pattern thereof is shown in FIG. 7.

In the same manner as in Example 1, the comparative compound 4 was subjected to measurement for the anion exchange capacity, the anion exchange capacity in the neutral aqueous solution, the percentage of loss on heating, and the electric conductivity of the supernatant, and these results were shown in Table 1.

TABLE 1

|  | Anion exchange capacity (meq/g) | Anion exchange capacity in neutral aqueous solution (meq/g) | Percentage of loss on heating (%) | Electric conductivity of supernatant (μS/cm) |
|---|---|---|---|---|
| Example 1 | 3.9 | 1.6 | 1.0 | 13 |
| Example 2 | 4.0 | 1.2 | 0.8 | 10 |
| Example 3 | 4.1 | 1.0 | 0.4 | 8 |
| Comparative Example 1 | 3.7 | 2.0 | 2.5 | 110 |
| Comparative Example 2 | 4.1 | 0.6 | 0.3 | 6 |
| Comparative Example 3 | 4.2 | 0.5 | 2.3 | 10 |
| Comparative Example 4 | 4.3 | 0.3 | 0.2 | 3 |

Example 4

A cresol novolak type epoxy resin of 80 parts (epoxy equivalent of 235), a brominated phenol novolak type epoxy resin of 20 parts (epoxy equivalent of 275), a phenol novolak resin of 50 parts (molecular weight of 700 to 1000), triphenyl phosphine of 2 parts, carnauba wax of 1 part, carbon black of 1 part, fused silica of 370 parts, and the anion exchanger 1 of 2 parts were mixed. This mixture was kneaded for 3 to 5 minutes with a hot calender roll (80° C. to 90° C.). Then, the mixture was cooled, and ground, so that a powdered epoxy resin composition 1 was obtained. Next, this composition 1 was sifted with a 100-mesh sieve, and a sample having a particle size of 100 mesh pass was produced.

This sample having a particle size of 100 mesh pass was used and cured at 170° C. to produce a kneaded resin 1. This kneaded resin 1 was ground to a particle size of 2 to 3 mm. The elution test of chlorine ions was performed using this ground sample.

Example 5

Except that the anion exchanger 2 was used instead of the anion exchanger 1, the same operation as in the case of production of the kneaded resin 1 was performed, and a ground sample of a kneaded resin 2 was produced.

Example 6

Except that the anion exchanger 3 was used instead of the anion exchanger 1, the same operation as in the case of production of the kneaded resin 1 was performed, and a ground sample of a kneaded resin 3 was produced.

Comparative Example 5

Except that the comparative compound 1 was used instead of the anion exchanger 1, the same operation as in the case of production of the kneaded resin 1 was performed, and a ground sample of a comparative kneaded resin 1 was produced.

Comparative Example 6

Except that the comparative compound 2 was used instead of the anion exchanger 1, the same operation as in the case of production of the kneaded resin 1 was performed, and a ground sample of a comparative kneaded resin 2 was produced.

Comparative Example 7

Except that the comparative compound 3 was used instead of the anion exchanger 1, the same operation as in the case of production of the kneaded resin 1 was performed, and a ground sample of a comparative kneaded resin 3 was produced.

Comparative Example 8

Except that the comparative compound 4 was used instead of the anion exchanger 1, the same operation as in the case of production of the kneaded resin 1 was performed, and a ground sample of a comparative kneaded resin 4 was produced.

Comparative Example 9

Except that the anion exchanger 1 was not used, the same operation as in the case of production of the kneaded resin 1 was performed, and a ground sample of a comparative kneaded resin 0 was produced. Namely, the comparative kneaded resin 0 contains no inorganic anion exchanger.
Chlorine Ion Extraction Test from the Kneaded Resin
5 g of the kneaded resin 1 and 50 ml of deionized water were placed in a pressure-resistant container made of polytetrafluoroethylene. The container was sealed, and heated at 125° C. for 100 hours. After cooling the container, the water was taken out and a concentration of chlorine ions and that of $NO_3$ ions eluted into the water were measured with ion chromatography. The result is shown in Table 2. Moreover, the pH of the supernatant was measured, and this result is shown in Table 2.

The test was similarly performed on the kneaded resins 2 and 3 and the comparative kneaded resins 0 to 4, and these results are shown in Table 2.

TABLE 2

| | Ground sample | Chlorine ion concentration (ppm) | $NO_3$ ion concentration (ppm) | pH |
|---|---|---|---|---|
| Example 4 | Kneaded resin 1 | 19 | 18 | 4.3 |
| Example 5 | Kneaded resin 2 | 21 | 15 | 4.3 |
| Example 6 | Kneaded resin 3 | 23 | 12 | 4.3 |
| Comparative Example 5 | Comparative kneaded resin 1 | 22 | 50 | 3.9 |
| Comparative Example 6 | Comparative kneaded resin 2 | 44 | 5 | 4.4 |
| Comparative Example 7 | Comparative kneaded resin 3 | 47 | 1 | 4.5 |
| Comparative Example 8 | Comparative kneaded resin 4 | 52 | 0 | 4.8 |
| Comparative Example 9 | Comparative kneaded resin 0 | 60 | 0 | 4.2 |

Apparently from Table 2, the inorganic anion exchanger of the present invention has a larger ion exchange capacity, and an effect of suppressing elution of chlorine ions is obtained even when the inorganic anion exchanger of the present invention is added to an encapsulating material resin. The comparative kneaded resin 1 suppresses elution of chlorine ions, but a larger amount of nitrate ions is eluted. Therefore, the comparative kneaded resin 1 is not practical.

According to the present invention, it is possible to provide an encapsulating material composition having higher reliability in a wider range.

INDUSTRIAL APPLICABILITY

The inorganic anion exchanger of the present invention has the anion exchangeability comparable to the existing inorganic anion exchangers. In addition, even when the inorganic anion exchanger of the present invention is added to a resin, the effect of suppressing elution of anions from the resin is obtained. From this, the inorganic anion exchanger of the present invention can be broadly used for various applications, such as encapsulation, coating, and insulation of electronic components and electrical components that need high reliability. Furthermore, the inorganic anion exchanger of the present invention can be used as a stabilizer for resins such as vinyl chloride, an anticorrosive, etc.

DESCRIPTION OF SYMBOLS

Figure 1:
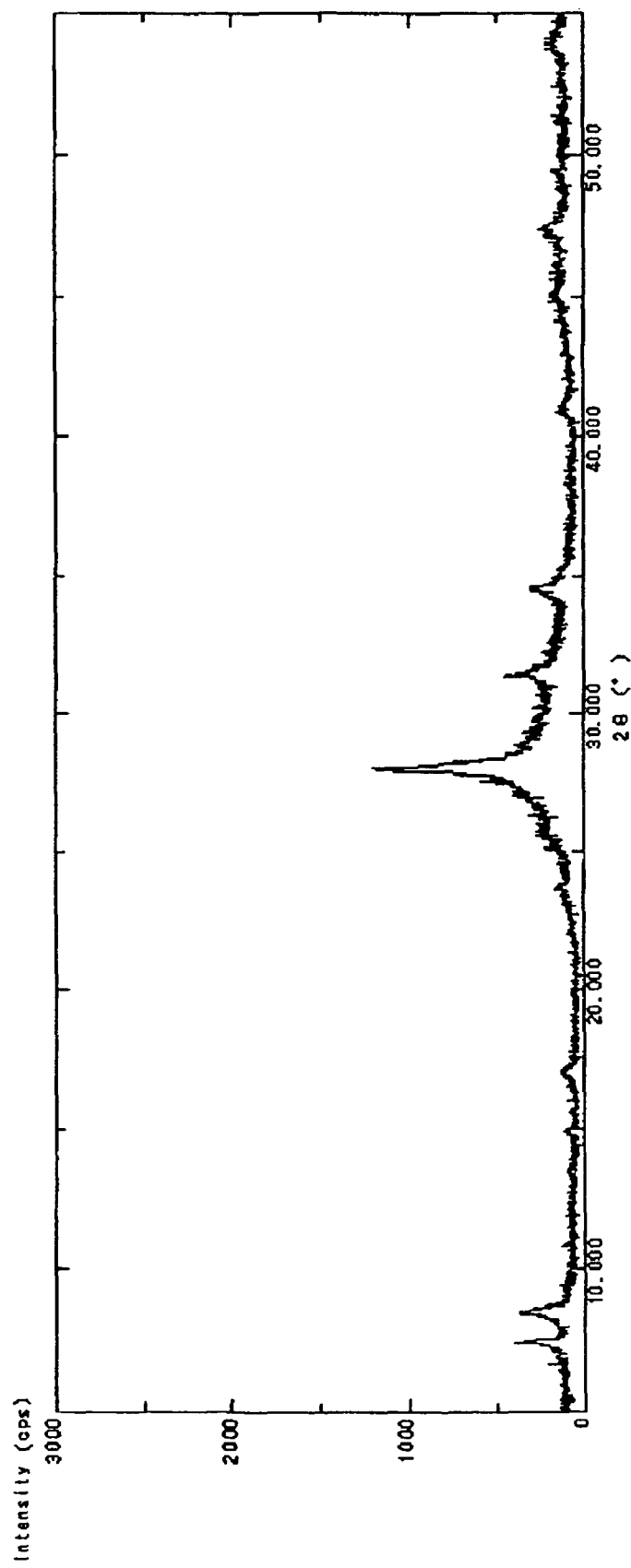
FIG. 1 shows an XRD pattern of a compound 1 (anion exchanger 1) produced in Example 1.
Figure 2:
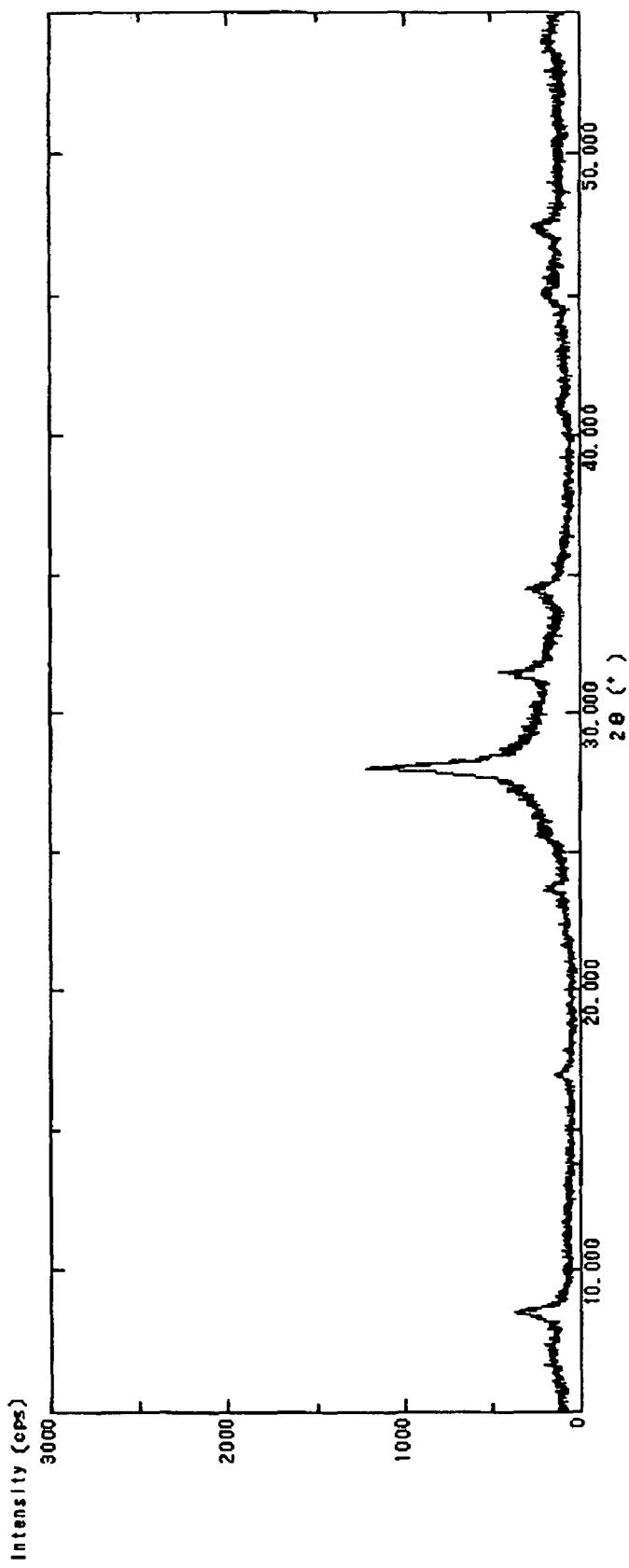
FIG. 2 shows an XRD pattern of a compound 2 (anion exchanger 2) produced in Example 2.
Figure 3:
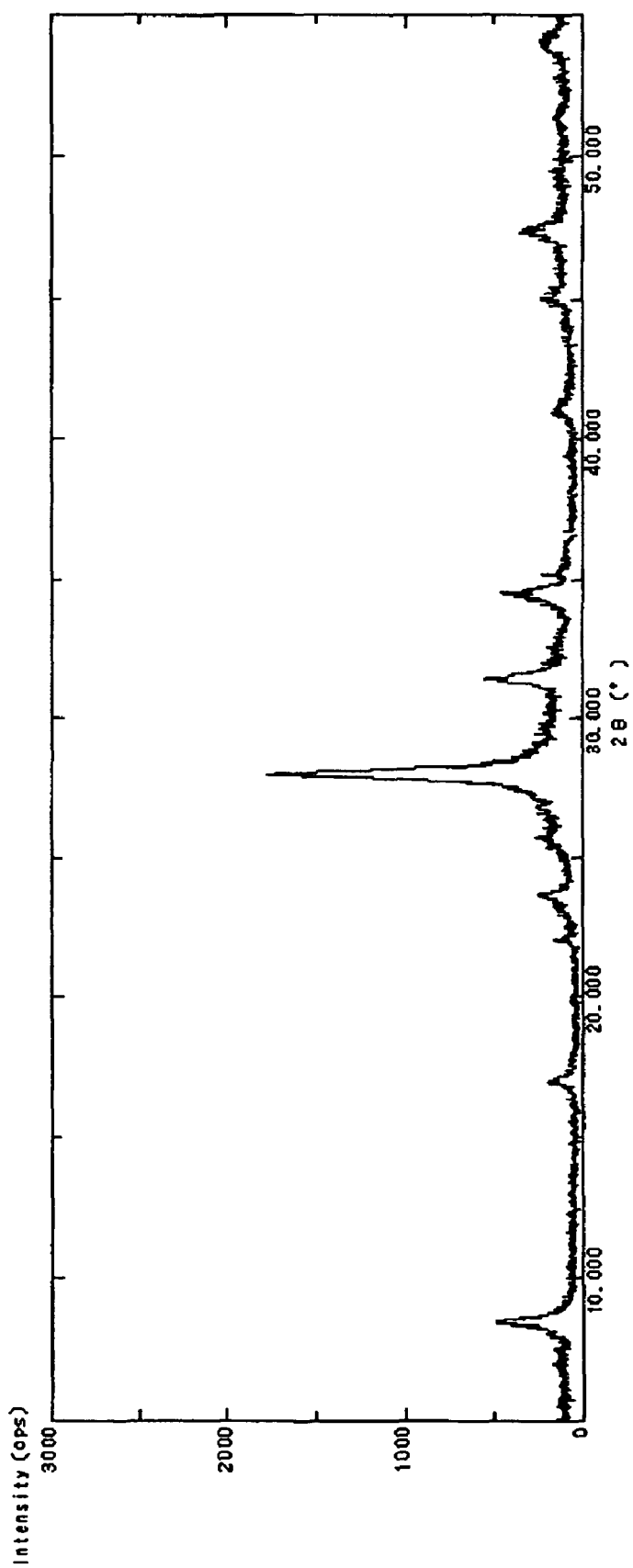
FIG. 3 shows an XRD pattern of a compound 3 (anion exchanger 3) produced in Example 3.
Figure 4:
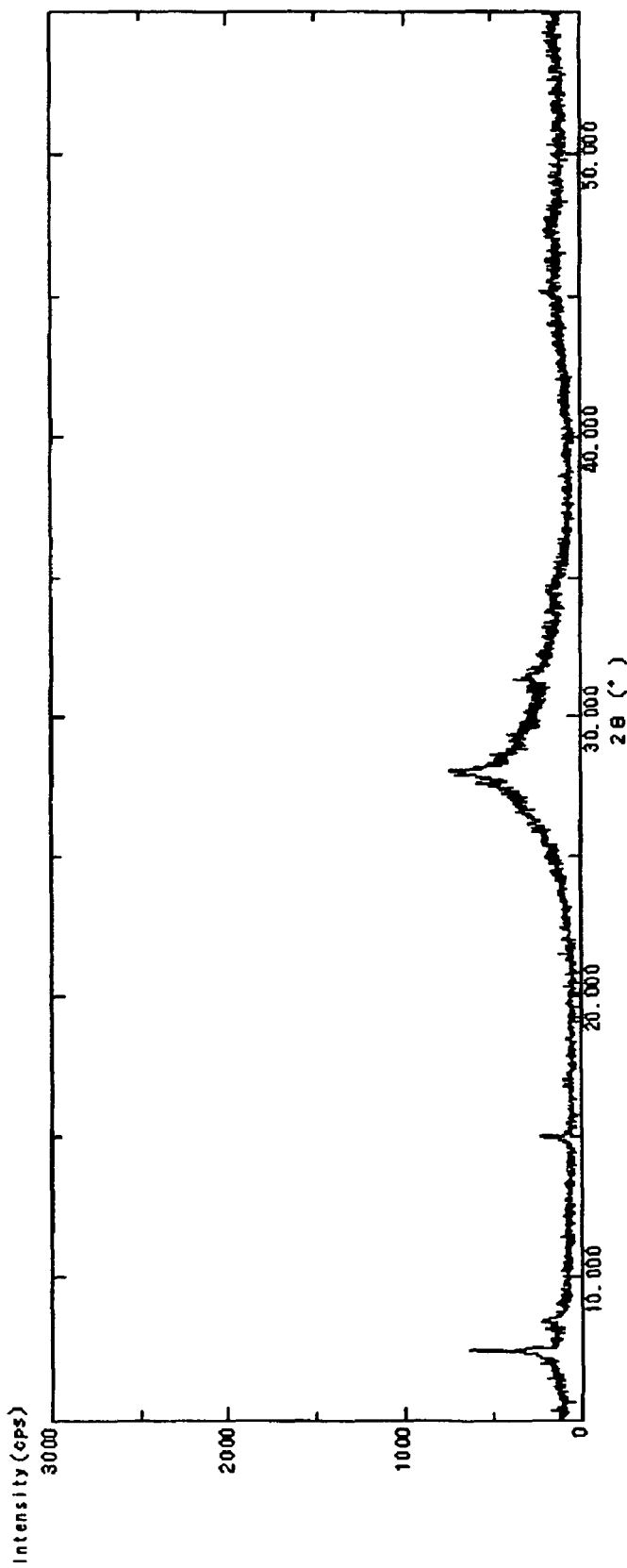
FIG. 4 shows an XRD pattern of a comparative compound 1 produced in Comparative Example 1.
Figure 5:
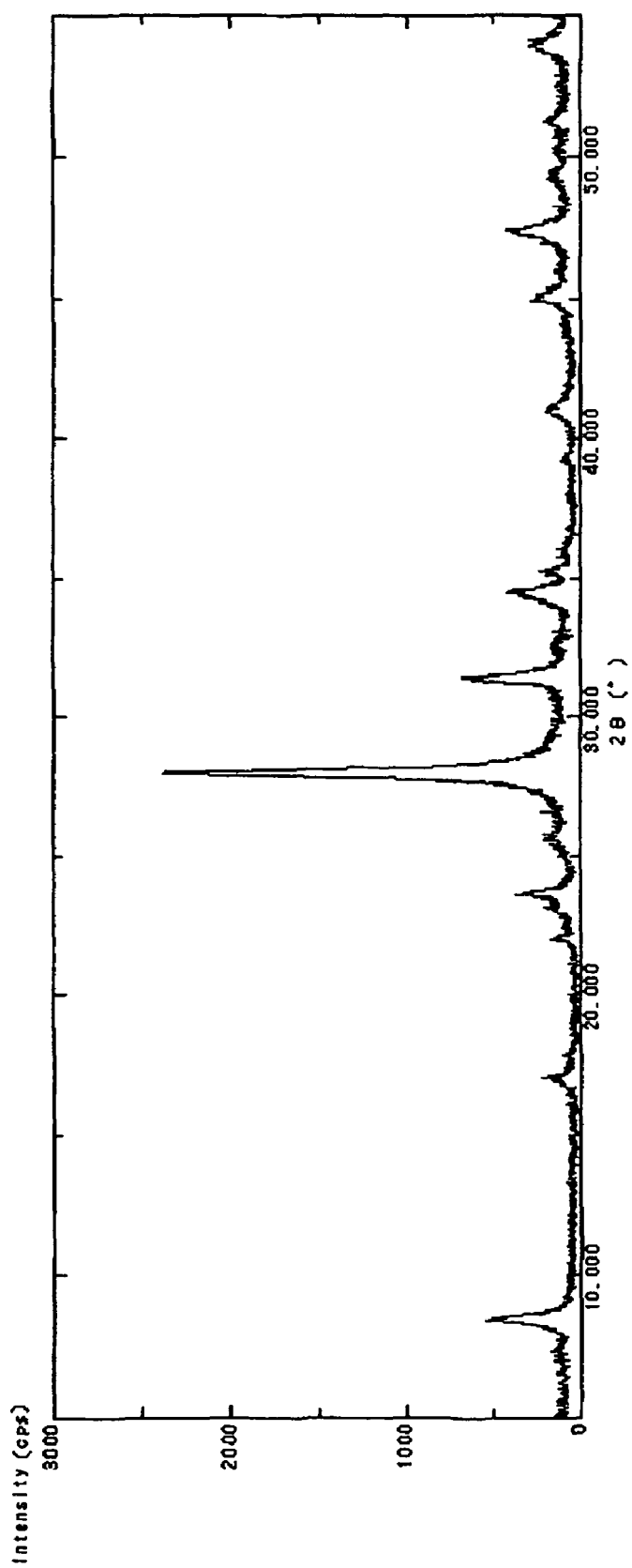
FIG. 5 shows an XRD pattern of a comparative compound 2 produced in Comparative Example 2.
Figure 6:
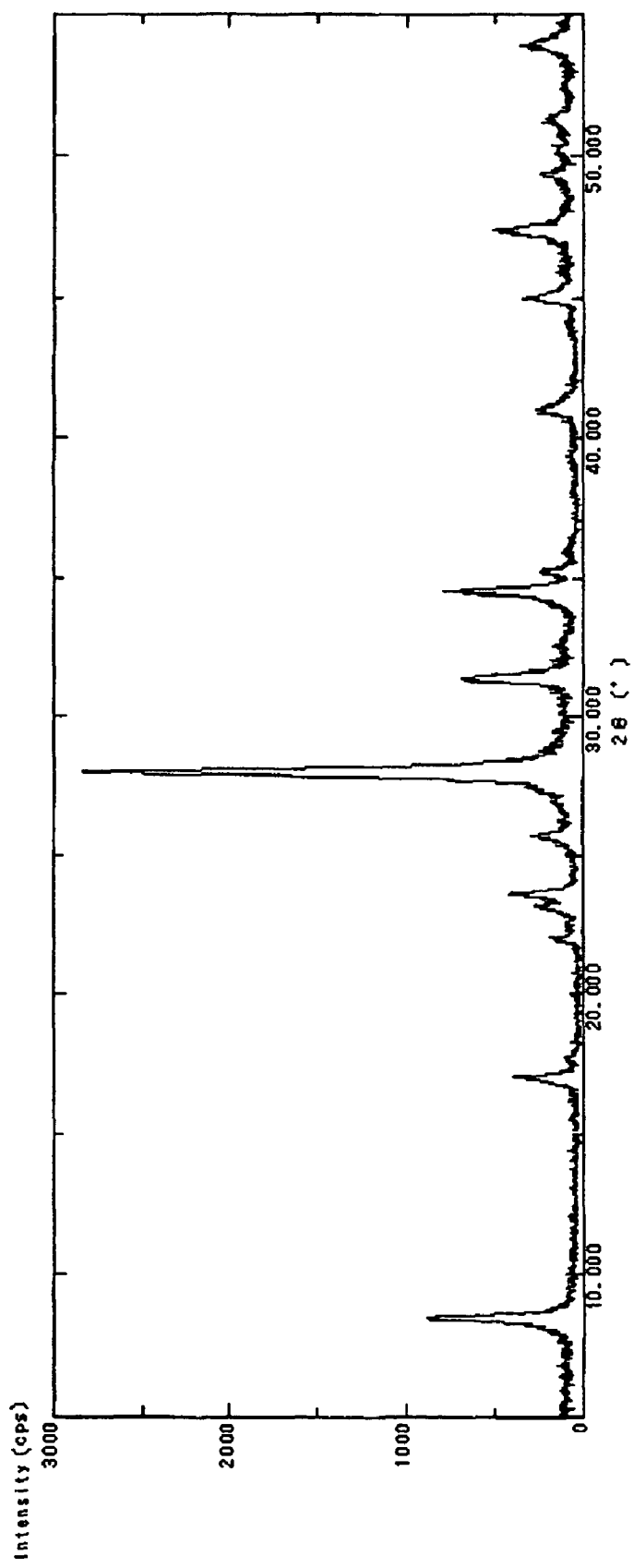
FIG. 6 shows an XRD pattern of a comparative compound 3 of Comparative Example 3.
Figure 7:
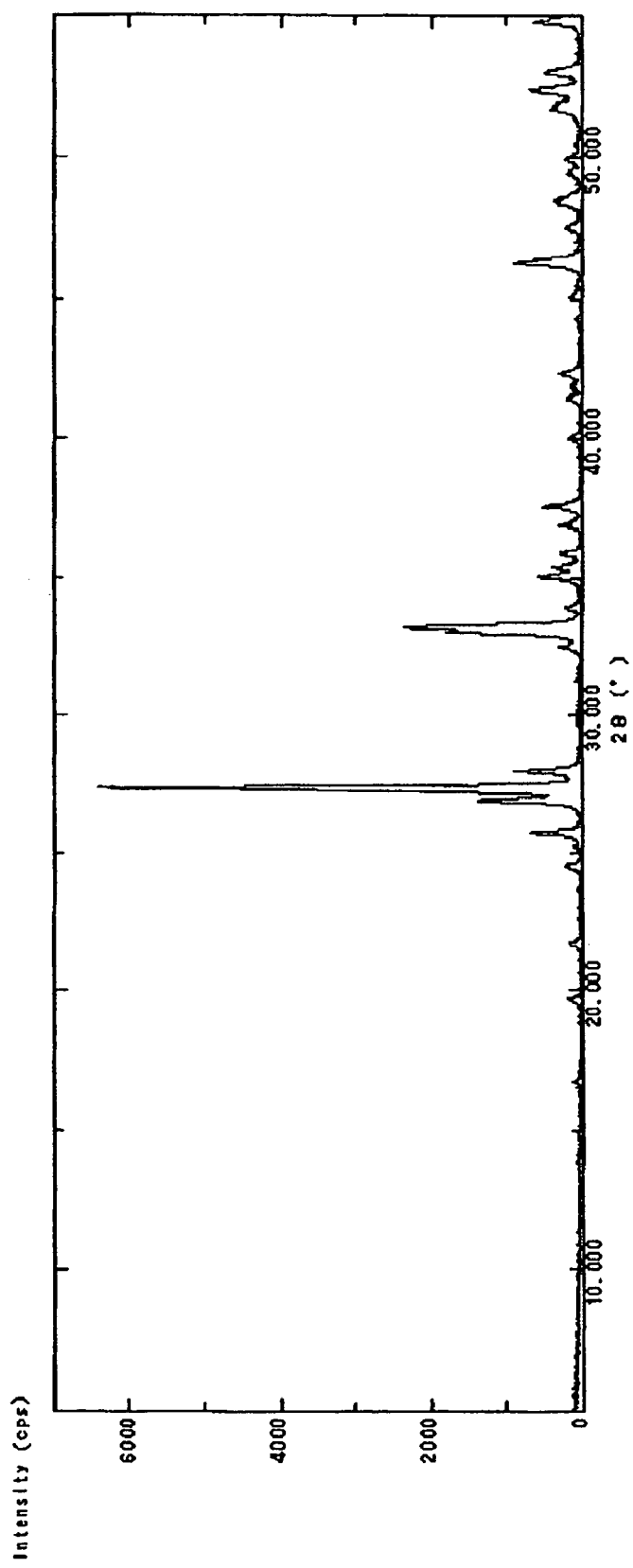
FIG. 7 shows an XRD pattern of a comparative compound 2 of Comparative Example 4.

The ordinate in FIGS. 1 to 7 shows diffraction intensity (cps) of XRD.

The abscissa in FIGS. 1 to 7 shows diffraction angle 2θ (degrees) of XRD.

The invention claimed is:

1. A bismuth compound represented by the following formula (1):

$$Bi(OH)_x(NO_3)_y \cdot nH_2O \quad (1)$$

wherein x is a positive number which is not less than 2.5 but is less than 3, y is a positive number which is not more than 0.5, x+y satisfies a value of 3, and n is 0 or a positive number, and wherein a peak intensity at 2θ=27.9° to 28.1° is 900 to 2000 cps and a peak intensity at 2θ=8.45° to 8.55° is 100 to 800 cps in a powder X-ray diffraction pattern.

2. The bismuth compound according to claim 1, wherein a peak intensity at 2θ=7.4° to 7.5° is not more than 1000 cps in a powder X-ray diffraction pattern.

3. An inorganic anion exchanger comprising the bismuth compound according to claim 1.

4. The inorganic anion exchanger according to claim 3, which has an anion exchange capacity of not less than 2.0 meq/g.

5. The anion exchanger according to claim 3, which has an anion exchange capacity of not less than 0.8 meq/g in a neutral aqueous solution.

6. The inorganic anion exchanger according to claim 3, which shows a mass decrease of not more than 2 mass % when heated to 300° C.

7. The inorganic anion exchanger according to claim 3, which provides a supernatant having an electric conductivity of not more than 50 ~S/cm when suspended in deionized water.

8. A resin composition for encapsulating electronic components, which comprises the inorganic anion exchanger according to claim 3.

9. The resin composition for encapsulating electronic components according to claim 8, which further comprises an inorganic cation exchanger.

10. A resin for encapsulating electronic components, obtained by curing the resin composition for encapsulating electronic components according to claim 8.

11. An electronic component obtained by encapsulating a component with the resin composition for encapsulating electronic components according to claim 8.

12. A varnish, adhesive, or paste, which comprises the inorganic anion exchanger according to claim 3.

13. The varnish, adhesive, or paste according to claim 12, which further comprises an inorganic cation exchanger.

14. A product which comprises the varnish, adhesive, or paste according to claim 12.

15. The inorganic anion exchanger according to claim 3, which has an anion exchange capacity of not less than 2.0 meq/g but not more than 10 meq/g.

16. The anion exchanger according to claim 3, which has an anion exchange capacity of not less than 0.8 meq/g but not more than 5 meq/g in a neutral aqueous solution.

17. The bismuth compound according to claim 1, wherein said peak intensity at 2θ=8.45° to 8.55° is 200 to 700 cps in a powder X-ray diffraction pattern.

18. The bismuth compound according to claim 1, wherein said peak intensity at 2θ=8.45° to 8.55° is 300 to 600 cps in a powder X-ray diffraction pattern.

19. The bismuth compound according to claim 2, wherein said peak intensity is 1100 cps when 2θ is 28°, said peak intensity is 380 cps when 2θ is 8.5°, and said peak intensity is 400 cps when 2θ is 7.4°.

20. The bismuth compound according to claim 2, wherein said peak intensity is 1200 cps when 2θ is 28°, said peak intensity is 370 cps when 2θ is 8.5°, and said peak intensity is 150 cps when 2θ is 7.4°.

21. The bismuth compound according to claim 1, wherein said peak intensity is 1800 cps when 2θ is 28°, and said peak intensity is 500 cps when 2θ is 8.5°.

22. The bismuth compound according to claim 2, wherein said peak intensity at 2θ=7.4° to 7.5° is not more than 700 cps in a powder X-ray diffraction pattern.

23. The bismuth compound according to claim 2, wherein said peak intensity at 2θ=7.4° to 7.5° is not more than 400 cps in a powder X-ray diffraction pattern.

24. The bismuth compound according to claim 1, wherein said compound is selected from the group consisting of
$Bi(OH)_{2.5}(NO_3)_{0.5}$,
$Bi(OH)_{2.55}(NO_3)_{0.45}$,
$Bi(OH)_{2.6}(NO_3)_{0.4}$,
$Bi(OH)_{2.65}(NO_3)_{0.35}$,
$Bi(OH)_{2.7}(NO_3)_{0.3}$,
$Bi(OH)_{2.75}(NO_3)_{0.25}$,
$Bi(OH)_{2.8}(NO_3)_{0.2}$,
$Bi(OH)_{2.85}(NO_3)_{0.15}$,
$Bi(OH)_{2.9}(NO_3)_{0.1}$, and
$Bi(OH)_{2.95}(NO_3)_{0.05}$.

25. The inorganic anion exchanger according to claim 3, which provides a supernatant having an electric conductivity of not less than 5 ~S/cm when suspended in deionized water.

26. The inorganic anion exchanger according to claim 3, which provides a supernatant having an electric conductivity of not more than 40 ~S/cm when suspended in deionized water.

27. The inorganic anion exchanger according to claim 3, which provides a supernatant having an electric conductivity of not more than 30 ~S/cm when suspended in deionized water.

28. A wiring board containing an effective amount of an inorganic anion exchanger according to claim 3.

* * * * *